(12) United States Patent
Porter et al.

(10) Patent No.: US 10,762,473 B2
(45) Date of Patent: Sep. 1, 2020

(54) TIME TRACKING AND PRODUCTIVITY SYSTEM

(71) Applicants: Scott Porter, Davis, CA (US); Quinn Baker, Sacramento, CA (US)

(72) Inventors: Scott Porter, Davis, CA (US); Quinn Baker, Sacramento, CA (US)

(*) Notice: Subject to any disclaimer, the term of this patent is extended or adjusted under 35 U.S.C. 154(b) by 32 days.

(21) Appl. No.: 15/952,212

(22) Filed: Apr. 12, 2018

(65) Prior Publication Data

US 2018/0232704 A1    Aug. 16, 2018

Related U.S. Application Data

(63) Continuation of application No. 14/489,279, filed on Sep. 17, 2014, now abandoned.

(60) Provisional application No. 61/879,746, filed on Sep. 19, 2013.

(51) Int. Cl.
*G06Q 10/10* (2012.01)
*G06Q 50/22* (2018.01)

(52) U.S. Cl.
CPC ......... *G06Q 10/1091* (2013.01); *G06Q 50/22* (2013.01)

(58) Field of Classification Search
USPC .......................................... 705/32
See application file for complete search history.

(56) References Cited

U.S. PATENT DOCUMENTS

| | | | |
|---|---|---|---|
| 2008/0120129 A1* | 5/2008 | Seubert | G06Q 10/10 705/35 |
| 2012/0089920 A1* | 4/2012 | Eick | G06T 11/206 715/739 |
| 2012/0233044 A1* | 9/2012 | Burger | G06Q 10/06 705/32 |

* cited by examiner

*Primary Examiner* — Garcia Ade
(74) *Attorney, Agent, or Firm* — Superior IP, PLLC; Dustin L. Call

(57) ABSTRACT

A system for automatically tracking employee hours. The system includes a tracking component. The tracking component is configured to determine the current location of the employee, determine if the current location of the employee is within a designated location and track the time spent by the employee within the designated location. The system also includes an evaluation module. The evaluation module is configured to receive from the tracking component the time spent by the employee within the designated location and determine if the time spent by the employee within the designated location exceeds a predetermined threshold and or to be used for the purpose of billing or to monitor and improve coordination of patient care.

21 Claims, 7 Drawing Sheets

FIG. 6

TIME TRACKING AND PRODUCTIVITY SYSTEM

CROSS-REFERENCE TO RELATED APPLICATIONS

This application claims the benefit of and priority to U.S. Provisional patent application Ser. No. 14/489,279 filed on Sep. 17, 2014, which application is incorporated herein by reference in its entirety.

Application Ser. No. 14/489,279 claims the benefit of and priority to U.S. Provisional Patent Application Ser. No. 61/879,746 filed on Sep. 19, 2013, which application is incorporated herein by reference in its entirety.

BACKGROUND OF THE INVENTION

In an effort to reduce patient care complications related to resident physician fatigue the ACGME has imposed work hour restrictions on a national level to limit the number of hours resident physicians can work. Although work hour restrictions are quite detailed in general most residents are currently limited to an 80 hour work week and shifts less than 24 hours.

Resident based medical institutions (more than 9,000 in the US) which are governed by the ACGME must therefore track and document resident work hours. Despite this regulation, work hour limits continue to be violated for many reasons. When the ACGME discovers that a residency program is violating work hour regulations that institution is subject to strict penalties including fines and probation or suspension.

Currently work hour restrictions are not adequately enforced and residents continue to work beyond their limits while jeopardizing patient care. The reasons for work hour violations are multiple but include inadequate man power, continuation of previous culture where residents worked unlimited hours without rest, abuse of power by superiors, blind neglect by superiors to enforce hours, inadequate infrastructure to enforce hours. Frequently, resident violation of work hour restrictions are self-imposed out of loyalty to the team or a sense that he/she is letting the team down by going home to rest.

Regardless of the reason that work hours are violated it is a fact that work hour violations continue at the expense of the resident but even more importantly at the expense of the patient. Currently our extensive survey indicates that institutions utilize suboptimal methods to track, monitor and report work hours. To the best of our knowledge and after exhaustive research we have yet to encounter a system for tracking resident work hours that does not rely on resident physician self-reporting. Current methods include self-reporting by way of web based applications, smart phone applications, surveys, paper documentation and many other methods. No system to date uses objective or passive methods to collect this data. These methods that require active resident participation to log hours are inherently flawed for multiple reasons. Residents are reluctant to report hours and when they do they feel pressure to report hours that conform with work hour restrictions. Residents that were interviewed expressed worries about being viewed as weak and having repercussions from seniors. They were concerned that the reporting of work hour overages may lead to suspension of their program with resulting collateral damage to their training. Additionally subjective reporting is by nature inaccurate as the data is not logged in real time and residents may forget or accidentally document hours that are inaccurate. Residents are already very busy and it is hard to perform the daily task of logging hours.

Accordingly, a system is needed to objectively, passively (resident is not required to self-report hours) and accurately track, monitor and not only report resident work hour statistics but also aid in the correction of those violations. Furthermore, the same system can be used to serve other functions in the work place. Including applications to track the time spent by different users in the hospital setting including time spent by users at various locations in the hospital and clinical setting for the purpose of capturing metrics including time spent with patients and at various locations in the hospital for the purpose of improving coordination of care and also for billing purposes.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for automatically tracking employee hours. The system includes a tracking component. The tracking component is configured to determine the current location of the employee, determine if the current location of the employee is within a designated location and track the time spent by the employee within the designated location. The system also includes an evaluation module. The evaluation module is configured to receive from the tracking component the time spent by the employee within the designated location and determine if the time spent by the employee within the designated location exceeds a predetermined threshold and or to be used for the purpose of billing or to monitor and improve coordination of patient care.

Another example embodiment includes a system embodied on a non-transitory computer-readable storage medium bearing computer-executable instructions that, when executed by a logic device, automatically tracks employee hours. The system includes a logic device. The system also includes one or more computer readable media, where the one or more computer readable media contain a set of computer-executable instructions to be executed by the logic device. The set of computer-executable instructions is configured to determine the current location of an employee and determine if the current location of the employee is within a designated location. The set of computer-executable instructions is also configured to track the time spent by the employee within the designated location and determine if the time spent by the employee within the designated location exceeds a predetermined threshold.

Another example embodiment includes a method of automatically tracking employee hours. The method includes determining the current location of an employee and determining if the current location of the employee is within a designated location. The method also includes if the current location of the employee is within the designated location tracking the time spent by the employee within the designated location and both to display this information to the user and also determining if the time spent by the employee within the designated location exceeds a predetermined threshold. The method further includes alerting a supervisor if the predetermined threshold is exceeded.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 6 illustrates an example of a user interface; and

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
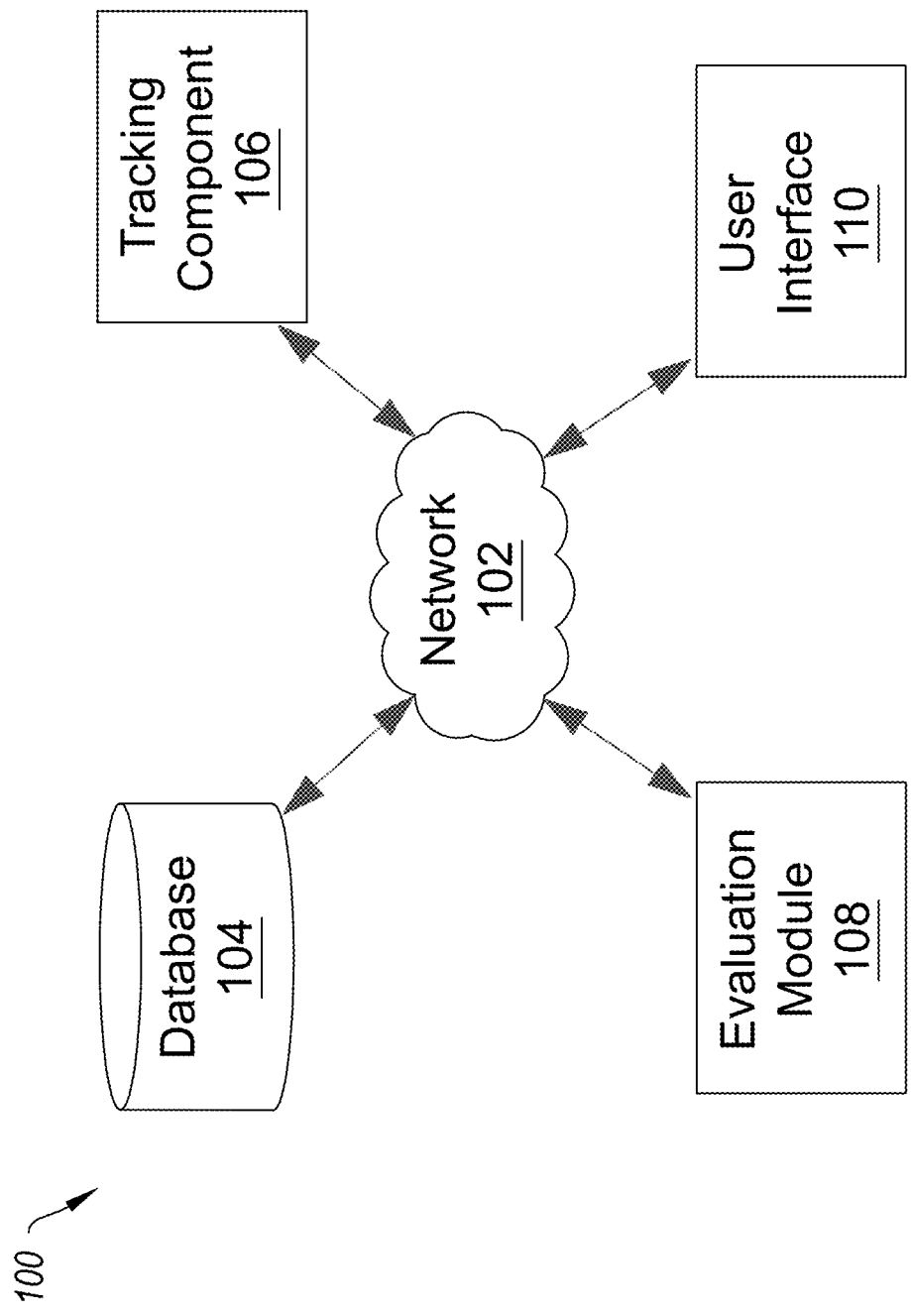
FIG. 1 illustrates a block diagram of a system for logging an employee's work time.

FIG. 1 illustrates a block diagram of a system 100 for logging an employee's (e.g., resident physician) work time. Although a resident's work time is used as exemplary herein the system 100 could be utilized in other industries including construction, nuclear power, airlines, etc or for other individuals, such as nurses, vendors, patients, etc. The system 100 can track a resident's working hours within specific locations. In particular, as the resident enters a designated location he/she needs to login to the system 100 so that it start tracking his/her hours. When the resident leaves the location or explicitly logs out from the system 100, the server is updated of the resident's exit. The duration of a resident's presence in a location is deemed to be his/her working hours in that location. The system 100 allows hospital administrators to manage various locations within the workplace and allows program administrators to view various measurements produced by the system 100. The attending physicians, residents and nurses can login to the system 100 to view the data pertaining to the current location in their respective work place. Attending physicians, residents and nurses can add their schedules to the system 100 to update the location data.

FIG. 1 shows that the system 100 can include a network 102. In at least one implementation, the network 102 can be used to connect the various parts of the system 100 to one another. The network 102 exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 includes one or more cellular RF networks and/or one or more wired and/or wireless networks such as, but not limited to, 802.xx networks, Bluetooth access points, wireless access points, IP-based networks, or the like. For example, the network 102 can include cloud based networking and computing. The network 102 can also include servers that enable one type of network to interface with another type of network.

FIG. 1 also shows that the system 100 can include a database 104. The database 104 can store resident or physicians work data. In particular, the database 104 can include any device that is capable of storing data. The data can be stored in digital form or in any other desired form. For example the database 104 can include memory or memory banks. Additionally or alternatively, the database 104 can run one or more applications which are accessed over the network 102. For example, the database 104 can include processors or other logic devices capable of executing software or carrying out other computer algorithms. The database 104 can allow a resident to access the hardware of the database 104 for remote computing or for information retrieval.

FIG. 1 shows that the system 100 can include a tracking component 106. The tracking component 106 determines the current location of a resident. The tracking component 106 can utilize geographic location functions, such as GPS geofence technology, iBeacons or any other desired location tracking technology. For example, during setup latitude and longitude coordinates can be mapped in a polygon fashion to set a geofence. When the pre-determined coordinates are crossed or passed (e.g., hospital walls or designated departments) with a location based electronic device (e.g., smart phone, tracker, tag, etc.) this is considered an "event" and triggers an associated clock that will manage the time based in a time clock fashion on this triggered event. The tracking component 106 can likewise track the time spent on certain tasks. For example, the tracking component 106 can track the amount of time that a resident spends in a particular patient's room, in a break area, doing paperwork, etc. This can assist in employee evaluation and/or billing scenarios. For example, if a patient is to be charged based on the time spent in a certain area (e.g., physical therapy) then the tracking component 106 can be used to determine the time spend in that area. The information from the tracking component 106 can be integrated into electronic medical records, billing statements, personnel evaluations, or any other desired records.

FIG. 1 also shows that the system 100 can include an evaluation module 108. The evaluation module 108 compares hours worked to the hours that should be worked. For example, the evaluation module can compile and/or compare information about hours logged, schedules, designated work locations, etc. For instance, the evaluation module 108 can monitor the time that the resident enters the designated location and remains active until the resident goes outside of the designated location. I.e., the tracking component 106 notes the location of the resident continuously and the evaluation module 108 determines at which point the resident enters the designated location and tracks time within the designated location or receives from the tracking component 106 the time spent within the designated location. The evaluation module 108 can compare the time within the designated location with the actual hours that the resident should be working and provide alerts if certain thresholds are exceeded (as described below).

FIG. 1 additionally shows that the system 100 can include a user interface 110. The user interface 110 can allow the resident and/or his/her supervisor(s) to receive information about resident work hours. For example, the user interface can allow a supervisor to view, hear or otherwise interact with the information about resident hours. The user interface 110 can include a graphical user interface, controls, speakers, displays or any other necessary hardware and/or software to adequately display the desired information to the resident and/or his/her supervisor(s), as described below.

In at least one implementation, a graphical user interface ("GUI" sometimes pronounced gooey) is a type of user interface 110 that allows users to interact with electronic devices with images rather than text commands. GUIs can be used in computers, hand-held devices such as MP3 players, portable media players or gaming devices, cell phones, household appliances and office equipment. A GUI represents the information and actions available to a user through graphical icons and visual indicators such as secondary notation, as opposed to text-based interfaces, typed command labels or text navigation. The actions are usually performed through direct manipulation of the graphical elements.

By way of example, the user interface 110 can include a computer program, app, webpage, website, or some other means for conveying desired information to a supervisor. For example, the user interface 100 can include a website that a supervisor can log on to and view resident hours, scheduled work hours, vacations, physicians/nurses with whom the resident has worked, etc. Additionally or alternatively, the user interface 100 can allow the supervisor to change information within the system 100. For example, the supervisor can set work hours, locations within the workplace in which the resident should work, etc.

Figure 2:
FIG. 2 illustrates an example of a tracking component during setup.

FIG. 2 illustrates an example of a tracking component 106 during setup. The tracking component can be installed on a tag, a badge, a smart phone, a tablet, an electronic device or any other desired device. For example, the tracking component 106 can include a smart phone app that automatically logs resident hours based on the location of the smart phone. Additionally or alternatively, the tracking component 106 can include a tag which communicates with an external device via RF signal to indicate when a resident enters or leaves a designated location.

FIG. 2 shows that the tracking component 106 can include a log in 202. The log in 202 allows the resident to set whether the tracking component 106 is logging time. For example, if the resident is going to the hospital for non-work reasons he/she would not want the tracking component 106 to log the hours as if they were being worked. Additionally or alternatively, the resident may wish to manually log hours. For example, work hours in a geographic location where automatic logging is not possible may be logged manually by a logged in resident.

FIG. 2 also shows that the tracking component 106 can include a program designation 204. The program designation 204 can set the designated location for which the resident's time will be tracked. I.e., if the program designation 204 is used to select a certain area of a hospital then time in another area of the hospital (e.g., the cafeteria) may not be logged against the resident's work hours.

FIG. 2 further shows that the tracking component 106 can include additional information 206. For example, the additional information 206 can include information about other employees, the resident's supervisor(s), designated work hours, designated work location or any other desired information. For instance, the following may be relatively static (i.e., will not change from day to day or over the course of their residency with few exceptions) and could be available as additional information 206:

I. Unique personal number identifier as well as program specific number identifier such as FRIDA number. Examples include:
  A. Name
  B. Address
  C. Residency Institution (UCSD, Stanford, etc.)
    1. Associated residency program or specialty (OB, Ortho, G Surg, ENT, etc.) with relevant static data including
      a) Resident Program director for each specialty (physician within each department responsible for coordinating residents)
      b) Resident Coordinator for each specialty (usually an administrative person whom assists the Resident Program Director with the administrative management of residents).
      c) All Attending physicians for each specialty will need to be logged in the system
      d) Start time for resident shifts: i.e., 07:00 hours
    2. Possible call scenarios at institution: home call, in house call, night float
    3. Any institutions that have "Work Hour Exceptions" through review committee. i.e., extension to 88 hour work week should be noted and factored into their specific system.
    4. If moon lighting is allowed the location of moon lighting should be determined so that GPS data can track when moonlighting occurs and this can be applied to total work hours.
II. Demographic and specialty related information Additionally or alternatively, the following dynamic information could be located in additional information 206:

I. Vacation schedule—obtained in the form of department wide vacation calendar which is regularly updated and disseminated. This data must be kept current in the software database so that a resident on vacation will not be bothered with assignments, tracking, push notifications etc.
II. Annual rotation schedule—so that the residents work assignments are known by the system and can be monitored and accessed by those utilizing various applications of the software
  A. This must also indicate year of residency i.e., intern vs. 5th year, etc. as this has implications for the work hour restrictions.
III. Call schedule—so that "in house call" days, "home call" days and post call days can be monitored and regulated via system applications to ensure that residents are compliant with work hour restrictions.
IV. Operative schedule for each attending (OR time and Location)
V. Weekly schedule as determined by chief on service. Chiefs currently email out weekly service schedules but an application could be built into the system to facilitate this. The system itself could track the real time whereabouts of the residents (i.e., in hospital, in OR, in Clinic, in Research Facility vs. Out for out of hospital, or Home Call).

Figure 3:
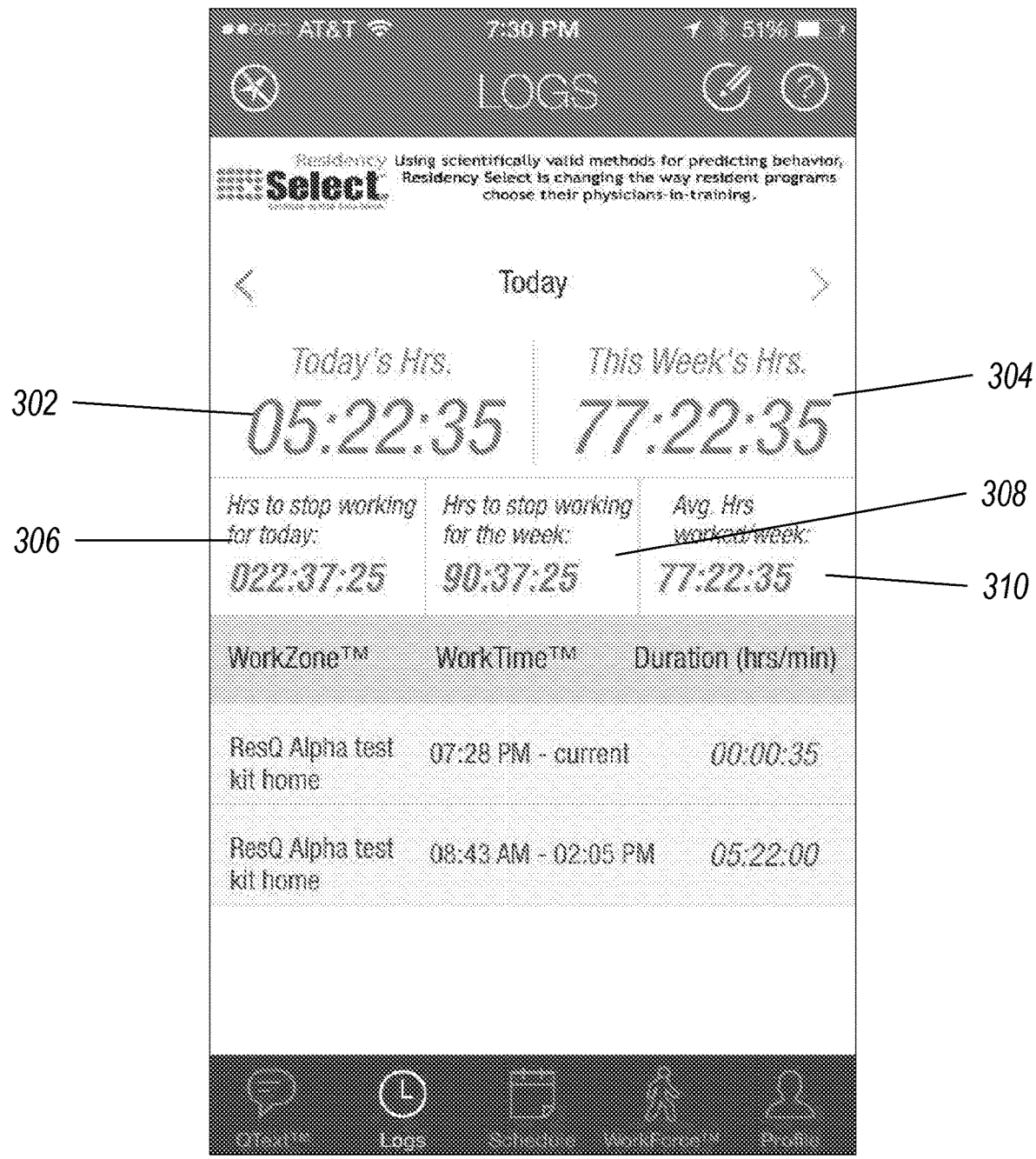
FIG. 3 illustrates an example of a tracking component during active logging.

FIG. 3 illustrates an example of a tracking component 106 during active logging. Active logging means that the resident has been deemed to enter the designated location and that the tracking component 106 is logging time. The tracking component 106 can enter a power save mode to preserve battery life during active logging or can remain visible to clearly show information.

FIG. 3 shows that the tracking component 106 can include a shift log 302. The shift log 302 shows the resident's most recent time in the designated location. I.e., the shift log 302 shows the resident's current time in the designated location or the resident's last previous time in the designated location. For example, if the resident is in the middle of a shift the shift log 302 can show how much time the resident has already worked. If the resident is not currently in the middle of a shift the shift log 302 can show how much time was worked in the last previous shift. One of skill in the art will appreciate that the shift log 302 can adjust for designated non-work times. For example, the shift log 302 can adjust for a resident's meal time or other breaks. I.e., the shift log 302 can show either the total time of the resident within the designated location or can show only the time that counts as work hours and ignores time that the resident should be taking breaks.

The shift log 302 can include a short trip buffer. I.e., short trips away from the designated location can be counted in the shift log 302. E.g., pacing in and out of the building while talking on the cell phone or lunch at a nearby restaurant where the resident returns to the designated location within a reasonable time. This reasonable time can be adjusted by system administrators. The shift log 302 continues to track the time as though the resident had not left the designated location and this time is added to the overall work hours for the resident's work shift. However, if the resident does not return or returns out of the reasonable time limit then the system would not be added to the resident's work shift.

Additionally or alternatively, the shift log 302 can include information worked at remote locations. For example, an on-call resident can track time related to home call. For example, the tracking component 106 can use the home address to calculate commute time to and from the hospital to home. Each time the resident is called into the hospital outside of regular working hours the drive time, the time spent in the hospital, as well as the time required to field a productive call from home (i.e., a call that requires the resident to return to the hospital) could be added together. Either a standard time allotment could be used for a "productive call" (e.g., 15 or 30 minutes) or the shift log 102 could actually track the time when the resident calls a hospital phone with a prefix that would be included in the software set as part of the tracking component. Additionally or alternatively, the tracking component 106 could consider the residents home address as a place of "work". While on home call and within a certain proximity to their home the system would register the resident at work.

FIG. 3 also shows that the tracking component 106 can include an aggregate log 304. The aggregate log 304 shows the work hours for a designated period of time. That is, the aggregate log 304 is a compilation of shift logs for some designated period of time to be measured (e.g., a week or a month). I.e., resident hours are regulated by the accreditation council for graduate medical education (ACGME). Current resident work hour restrictions per ACGME are as follows:

I. Duty hours must be limited to 80 hours per week, averaged over a four week period, inclusive of all in-house call activities and all moonlighting.
  A. The tracking component 106 may track time in work place from Monday to Sunday of a given week beginning at designated start time (i.e., 07:00 hours on Monday until the same day and time the following week) and average this data over a 4 week period. In event that resident continues to accumulate work hours that are likely to exceed the remaining hours allowed in the work week the system will push/text resident a notice a warning about their remaining time in the hospital before exceeding work hour restrictions. If the remaining work time allotment prior to exceeding limit reaches 1 hour count down then push notice is sent to the chief resident. If this time approaches 30 minutes then push notice is escalated up the seniority ladder and warning is sent to Resident, Chief, Attending on Call and (reply options should exist in the system for senior staff to reply with a text or push notice to address the warning). If time is limited to 10 minutes then the same notice is repeated and should also be sent to a faculty member or administrative person such as the Residency Coordinator whom is always available (not tied up in operating room or with clinical responsibilities) to field push notifications or texts and to assist in the coordination of evacuating the resident from the hospital prior to causing damage to patient care or exceeding work hour restrictions. If time tracked for a given resident exceeds the allotted work hour restrictions then the push notification/text will be sent to Resident, Chief, Attending on Call, Residency Coordinator and to Program Director (Physician in every department responsible for resident care) and with a carbon copy to the DIO (physician or appointed representative for University that coordinates ALL residents and corresponds with ACGME). The system would track and tally violations and compile this data with push notifications to the DIO so that violations can be addressed if they are redundant.

II. Duty Hour Exceptions. A Review Committee may grant exceptions for up to 10% or a maximum of 88 hours to individual programs based on a sound educational rationale.
  A. This will be individual to each institution and will be rare as most institutions have not sought 88 hour exception. However the aggregate log 302 can be modified for a specific institution.

III. Time spent by residents in Internal and External Moonlighting (as defined in the ACGME Glossary of Terms) must be counted towards the 80-hour Maximum Weekly Hour Limit. PGY-1 (first year residents or intern residents) are not permitted to moonlight.
  A. When moonlighting is allowed by a residency program, the system should allow for the location of moonlighting to be input so that the system can track these hours as though they are work hours. The system should distinguish that the hours are from moonlighting so that reports generated by the program can determine if moonlighting is a culprit related to work hour violations.

IV. Mandatory Time Free of Duty: Residents must be scheduled for a minimum of one day free of duty every week (when averaged over four weeks). At-home call cannot be assigned on these free days.
  A. The tracking component 106 may track time to ensure resident has minimum of one day free of duty every week averaged over a four week period (i.e., a full 24 hours off). Push notifications or texts should be sent to Chief of Service, with CCs to Residency Program Director when this does not occur. Repeat violations within a given program should be pushed to DIO and should be populated in reports generated through report applications so measures can be taken to resolve such issues.

V. Maximum Duty Period Length: Duty periods of PGY-1 residents must not exceed 16 hours in duration. Duty periods of PGY-2 residents and above may be scheduled to a maximum of 24 hours of continuous duty in the hospital.

A. The tracking component 106 may track time for work shifts for individual days of the week. This would be set at a designated work start time for each day based on the desire of a given Residency Program. Default would be a designated start time (i.e., 07:00 hours for any given day with end time at the same time the following day). The system maximum for an intern or PGY1 would be set at 16 hours whereas the maximum for PGY-2 and beyond to include the Chief would be set at 24 hours. In event that resident continues to accumulate work hours that are likely to exceed the remaining hours or minutes allowed in the shift the system will push/text the Resident a warning notice about their remaining time in the hospital before exceeding work hour restrictions. If the remaining work time allotment prior to exceeding limit reaches 1 hour count down then push/text notice is sent to the chief resident. If this time approaches 30 minutes then push notice is escalated up the seniority ladder and warning is sent to Resident, Chief, Attending on Call and (for all scenarios a reply options should exist in the system for all members but especially senior staff to reply with a text or push notice to address the warning. All members should be copied on all notifications to facilitate communication). If time is limited to 10 minutes then the same notice is repeated and should also be sent to a faculty member or administrative person such as the Residency Coordinator whom is always available (not tied up in operating room or with clinical responsibilities) to field push notifications or texts and to assist in the coordination of evacuating the resident from the hospital prior to causing damage to patient care or exceeding work hour restrictions. If time tracked for a given resident exceeds the allotted work hour restrictions then the push notification/text will be escalated to Resident, Chief, Attending on Call, Residency Coordinator and to Program Director (Physician in every department responsible for resident care) and with a carbon copy to the DIO (physician or appointed representative for University that coordinates ALL residents and corresponds with ACGME) or any other high level executive that the institution would like to be apprised of violations. The system would track and tally violations and compile this data with push notifications to the DIO so that violations can be addressed if they are redundant. Filters should exist to allow institution to set the parameters of these notifications, including the time points at which notifications are distributed, who is sent notifications, at what point certain notifications are escalated (i.e., number of violations and when escalated who do the notices go to).

VI. In unusual circumstances, residents, on their own initiative, may remain beyond their scheduled period of duty to continue to provide care to a single patient. Justifications for such extensions of duty are limited to reasons of required continuity for a severely ill or unstable patient, academic importance of the events transpiring, or humanistic attention to the needs of a patient or family. Under those circumstances, the resident must: 1. appropriately hand over the care of all other patients to the team responsible for their continuing care. 2. Document the reasons for remaining to care for the patient in question and submit that documentation in every circumstance to the program director. 3. The program director must review each submission of additional service, and track both individual resident and program-wide episodes of additional duty.

A. The aggregate log 304 can allow a resident to indicate that the violation is an exception and to facilitate documentation of above requirements.

VII. Minimum Time Off between Scheduled Duty Periods: PGY-1 residents should have 10 hours, and must have eight hours, free of duty between scheduled duty periods. Intermediate-level residents [as defined by the Review Committee] should have 10 hours free of duty, and must have eight hours between scheduled duty periods. They must have at least 14 hours free of duty after 24 hours of in-house duty. Residents in the final years of education [as defined by the Review Committee] must be prepared to enter the unsupervised practice of medicine and care for patients over irregular or extended periods This preparation must occur within the context of the 80-hour, maximum duty period length, and one-day-off-in-seven standards. While it is desirable that residents in their final years of education have eight hours free of duty between scheduled duty periods, there may be circumstances [as defined by the Review Committee] when these residents must stay on duty to care for their patients or return to the hospital with fewer than eight hours free of duty. Circumstances of return-to-hospital activities with fewer than eight hours away from the hospital by residents in their final years of education must be monitored by the program director.

A. The aggregate log 302 can allow for Chief resident (in final year of residency) to make exceptions to rules with exceptions to the above when permitted.

VIII. Maximum Frequency of In-House Night Float. Residents must not be scheduled for more than six consecutive nights of night float. [The maximum number of consecutive weeks of night float, and maximum number of months of night float per year may be further specified by the Review Committee.]

IX. Maximum In-House On-Call Frequency: PGY-2 residents and above must be scheduled for in-house call no more frequently than every-third-night (when averaged over a four-week period) Specific push notifications X. At-Home Call: Time spent in the hospital by residents on at-home call must count towards the 80-hour maximum weekly hour limit. The frequency of at-home call is not subject to the every-third-night limitation, but must satisfy the requirement for one-day-in-seven free of duty, when averaged over four weeks. At-home call must not be so frequent or taxing as to preclude rest or reasonable personal time for each resident. Residents are permitted to return to the hospital while on at-home call to care for new or established patients. Each episode of this type of care, while it must be included in the 80-hour weekly maximum, will not initiate a new "off-duty period".

FIG. 3 further shows that the tracking component 106 can include time remaining in current shift 306. Time remaining in current shift 306 can include time to scheduled cessation of the current shift. I.e., if the resident is scheduled to work until 5:00 pm the time remain in current shift 306 can be the time until 5:00 pm is reached. Additionally or alternatively, the time remaining in current shift 306 can be time at which the resident will reach work limits. I.e., if the resident would violate ACGME requirements if he/she worked beyond a certain time the time remaining in current shift 306 can reflect the time remaining until a violation occurs.

FIG. 3 additionally shows that the tracking component 106 can include aggregate time remaining 308. Aggregate time remaining 308 can include time within the designated period which remains available for the resident to work. For example, if the resident has currently worked 60 hours of his/her allowed 80 hour work week then the aggregate time remaining 308 can reflect a time of 20 hours that may still be worked in the week.

FIG. 3 moreover shows that the tracking component 106 can include an average time worked 310. The average time worked 310 can include an average of recent aggregate logs 304. That is, the average time worked 310 can be an average of n recent aggregate logs 304. For example, the average time worked can be the average of the aggregate time worked over the most recent four weeks.

Figure 4:
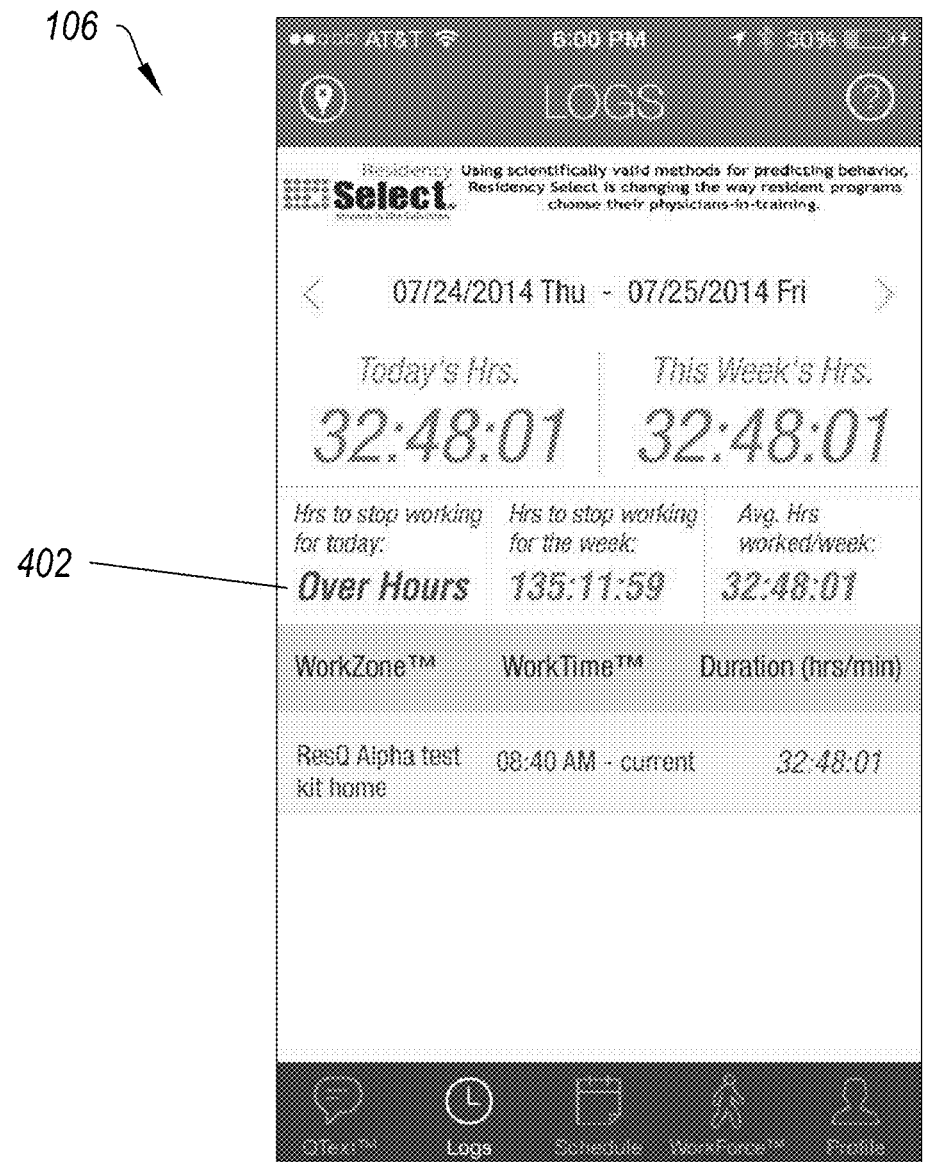
FIG. 4 illustrates an example of a tracking component in a notification mode.

FIG. 4 illustrates an example of a tracking component 106 in a notification mode. A notification mode alerts a resident and/or his/her supervisor(s) that some action needs to occur. For example, the action may include the resident ending his/her shift, beginning his/her shift, ceasing to work, or a violating work hours or other information regarding work schedule.

FIG. 4 shows that the tracking component 106 can include an alarm 402. The alarm 402 can alert the resident and/or supervisor(s) that the resident's hours are above allowed limits. One of skill in the art will appreciate that either the current log 302, the aggregate log 304, the average time worked 310 or any combination thereof can trigger a notification to the resident and/or the resident's supervisor(s). I.e., the current log 302, the aggregate log 304 and/or the average time 310 can be compared to the work rules and notify a resident and/or his/her supervisor that a violation has occurred to allow for corrective actions when desired.

For example, if logged hours are near maximum allowed limits a page, text, email, push notification, visual alarm, audio alarm or other alert may be sent to a resident that indicate time left before violating work hour restrictions. The resident may also have the option to respond to these messages with various predefined responses and this communication would be tracked by the cloud based database for each resident. In the event that the tracking component 106 pushes a notice to the smart phone that the resident has violated a work hour restriction, this communication may lead to a number of functions including text warnings but it also alerts the resident's supervisor.

Additionally or alternatively, the alarm 402 can include communicating to a badge give to the resident. I.e., an ID badge with a built in hardware indicator (auditory or visual indicator) and transponder that communicates with the tracking component 106. For example, the badge can include a clock which may change colors depending on the work time status of the resident. E.g., when a resident has gone over the allotted hours then the "clock" may turn from green to red. Additionally or alternatively, when the resident has a limited amount of time remaining before a violation (e.g., 30 minutes) the clock will change to yellow. Or if the resident is over hours but on allotted education time and in an area that is designated for education or research (which is allowed by the current ACGME guidelines) the clock could blink green. Different indicators could be used on the badge to openly indicate the status of the resident and other features may be included such as an LCD display, etc. This will be valuable information to colleagues but more importantly to patients. For the first time in history a patient under the care of a physician will know for certain that the physician is within the boundaries of industry accepted standards for their shift.

Figure 5:
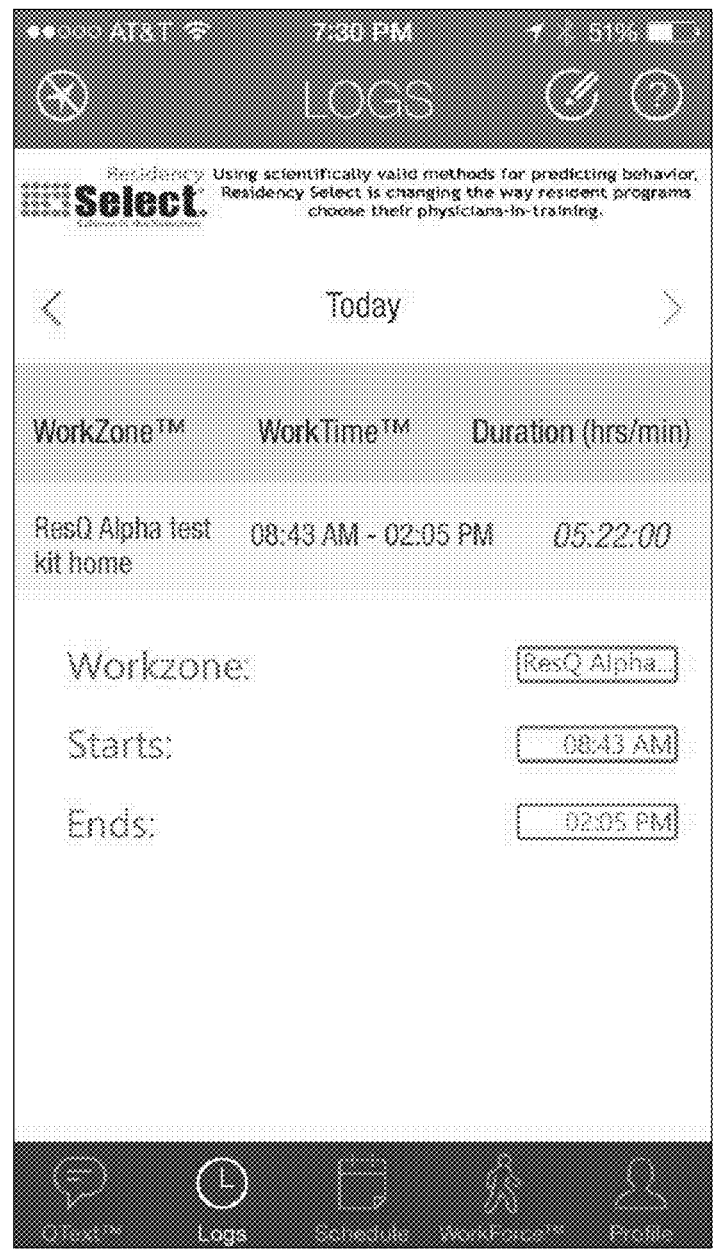
FIG. 5 illustrates an example of a tracking component which is being edited.

FIG. 5 illustrates an example of a tracking component 106 which is being edited. For example, the resident may visit a friend or colleague before work hours, may be engaging in education time that should not be logged, may forget the tracking device or other errors may occur. The edit function allows the resident to change the beginning time of logging to reflect the actual start time rather than the start time created as the resident enters the designated location.

Figure 6:
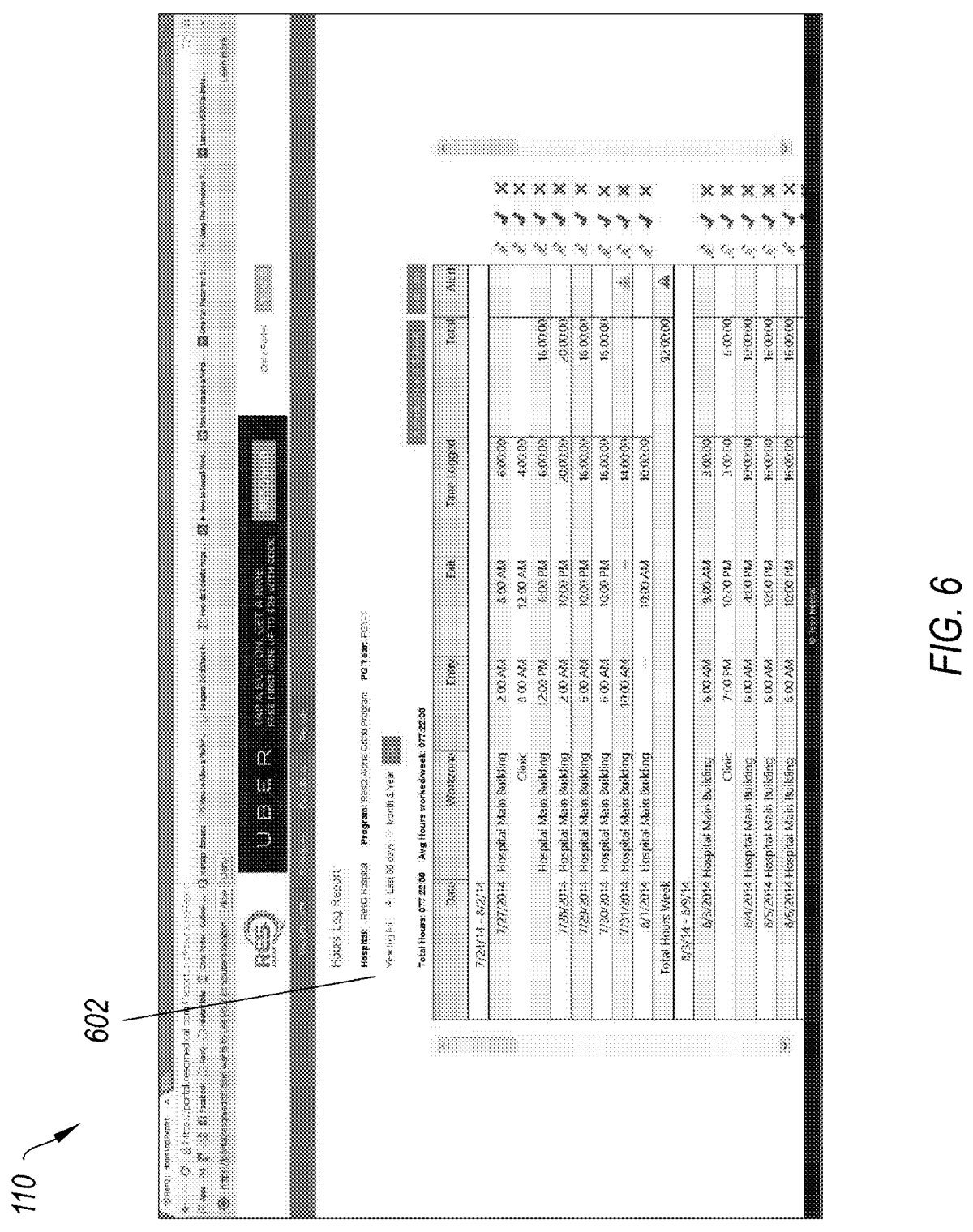

FIG. 6 illustrates an example of a user interface 110. The user interface 110 allows a resident and/or his/her supervisor to see desired information. For example, the user interface 110 can include a time log, either for an individual resident or for multiple residents simultaneously. Additionally or alternatively, the user interface 110 can allow a supervisor to enter information such as schedules, vacation times, program requirements, etc.

FIG. 6 shows that the user interface 110 can include a time log 602. The time log 602 can include all logged information for a resident. Additionally or alternatively, the time log 602 can include any alerts that are given for the resident and may allow the supervisor to note why the alert should be or is subject to an exemption.

Additionally or alternatively, the user interface 110 can provide reports to the resident. For example, the user interface 110 can show residents who are actively working vs. those residents who are away from the hospital and are not on vacation so that available man power can be evaluate and harnessed by either suggesting residents that may be placed on call or asked to work to facilitate locating needed employees without violating work hour restrictions.

Figure 7:
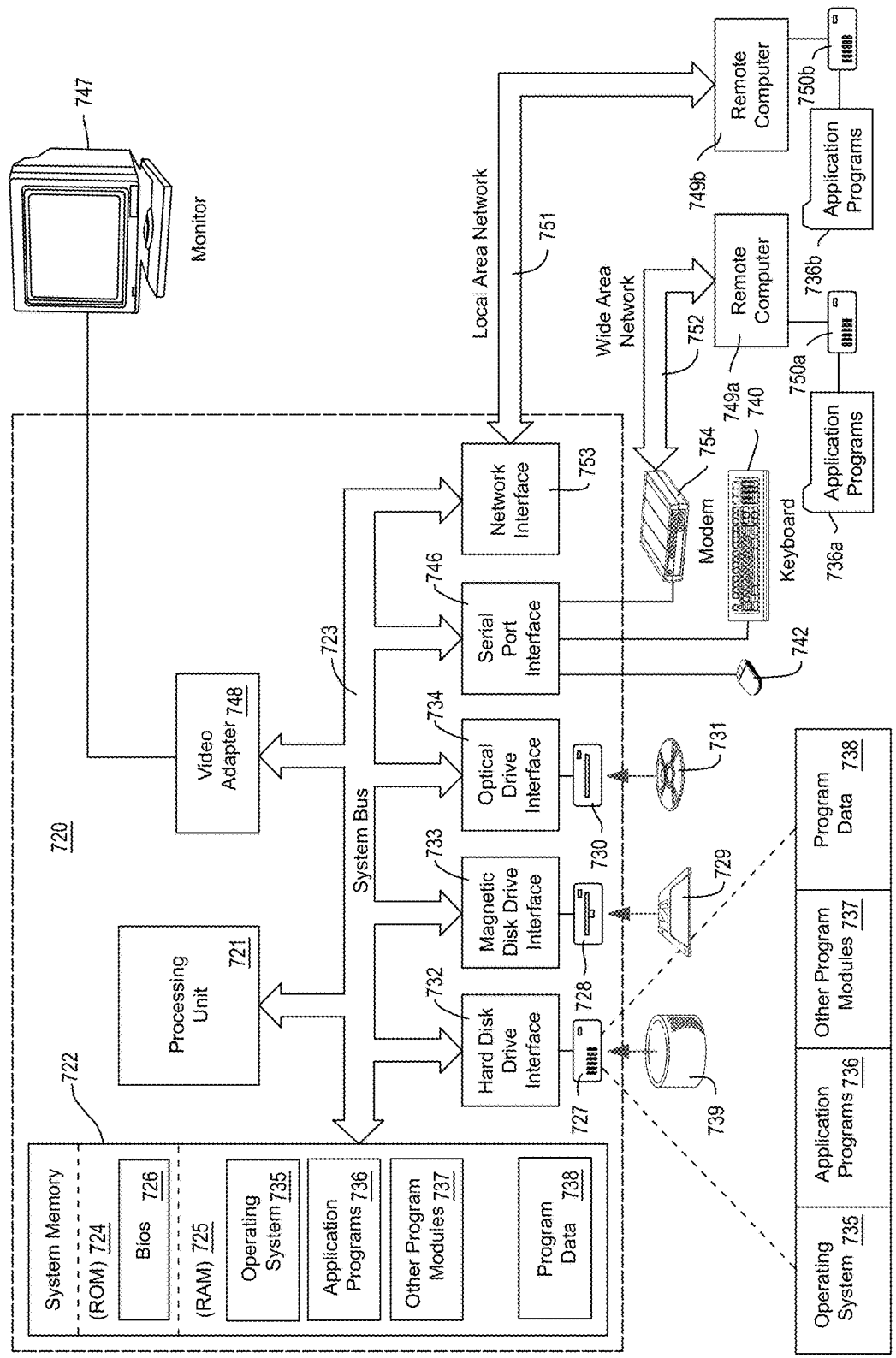
FIG. 7 illustrates an example of a suitable computing environment in which the invention may be implemented.

FIG. 7, and the following discussion, is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an example system for implementing the invention includes a general purpose computing device in the form of a conventional computer 720, including a processing unit 721, a system memory 722, and a system bus 723 that couples various system components including the system memory 722 to the processing unit 721. It should be noted however, that as mobile phones become more sophisticated, mobile phones are beginning to incorporate many of the components illustrated for conventional computer 720. Accordingly, with relatively minor adjustments, mostly with respect to input/output devices, the description of conventional computer 720 applies equally to mobile phones. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disc drive 730 for reading from or writing to removable optical disc 731 such as a CD-ROM or other optical media. The magnetic hard disk drive 727, magnetic disk drive 728, and optical disc drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disc 731, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 739, magnetic disk 729, optical disc 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 can be connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for automatically tracking employee hours, the system comprising:
   an electronic tracking component, wherein the electronic tracking component includes:
      a memory;
      a processor coupled to the memory programmed with executable instructions, the instructions including:
         determine the current location of the tracking component;
         determine if the current location of the tracking component is within one or more designated work locations;
         if the current location of the tracking is within the one or more designated work locations, track the time spent by the tracking component within the one or more designated work locations; and
         send an electronic communication, the electronic communication indicative of the time spent by the tracking component within the one or more designated work locations; and
   an evaluation module, wherein the evaluation module includes:
      a memory;
      a processor coupled to the memory programmed with executable instructions, the instructions including:
         receive the electronic communication from the tracking component; and
         identify an employee to which the tracking component has been assigned;
         attribute the time spent by the tracking component within the one or more designated work locations to the employee;

determine if the time attributed to the employee within the one or more designated work locations exceeds a predetermined threshold for the employee.

2. The system of claim 1, wherein the tracking component includes a portable electronic device.

3. The system of claim 2, wherein the portable electronic device includes a smart phone.

4. The system of claim 1, wherein the tracking component tracks the current location of the tracking component using at least one of:
   GPS;
   geofence technology; or
   iBeacons.

5. The system of claim 1, wherein:
   the predetermined threshold is stored in a database; and
   the evaluation module, by the processor, retrieving the predetermined threshold from the database.

6. The system of claim 1, wherein the time attributed to the employee within the one or more designated work locations is shown to a supervisor via a user interface.

7. The system of claim 6, wherein the user interface allows the supervisor to set the predetermined threshold.

8. The system of claim 1, wherein the time spent by the tracking component within the one or more designated work locations is integrated into an electronic medical record.

9. The system of claim 1, wherein the time spent by the tracking component within the one or more designated work locations is integrated into a billing statement.

10. The system of claim 1, wherein the one or more designated work locations includes a remote location.

11. The system of claim 1 further comprising the tracking component, by the processor showing the employee a shift log configured to track the time of the employee's current shift.

12. The system of claim 1 further comprising the tracking component, by the processor, showing the employee an aggregate log configured to track the total time worked by the employee over a designated period of time.

13. The system of claim 12, wherein the designated period of time includes one week.

14. A system for automatically tracking employee hours, the system comprising:
   an electronic tracking component, wherein the electronic tracking component includes:
      a memory;
      a processor coupled to the memory programmed with executable instructions, the instructions including:
         determine the current location of the tracking component;
         determine if the current location of the tracking component is within one or more designated work locations;
         if the current location of the tracking is within the one or more designated work locations, track the time spent by the tracking component within the one or more designated work locations; and
         send an electronic communication, the electronic communication indicative of the time spent by the tracking component within the one or more designated work locations; and
   an evaluation module, wherein the evaluation module includes:
      a memory;
      a processor coupled to the memory programmed with executable instructions, the instructions including:
         receive the electronic communication from the tracking component; and
         identify an employee to which the tracking component has been assigned;
         attribute the time spent by the tracking component within the one or more designated work locations to the employee;
         determine if the time attributed to the employee within the one or more designated work locations exceeds a predetermined threshold for the employee; and
         send an alert to a supervisor if the predetermined threshold is exceeded.

15. The system of claim 14, wherein the evaluation module, by the processor, is configured to alert a supervisor of the employee if the time spent by the employee within the one or more designated work locations exceeds the predetermined threshold.

16. The system of claim 14, wherein determining if the time attributed to the employee within the one or more designated work locations exceeds a predetermined threshold includes comparing the time spent by the employee in a current shift with an assigned shift.

17. The system of claim 14, wherein determining if the time attributed to the employee within the one or more designated work locations exceeds a predetermined threshold includes comparing the time spent by the employee in a current work week with an assigned work week.

18. A method of automatically tracking employee hours where the employee is engaged in providing healthcare services to a patient, the method comprising:
   assigning each employee an electronic tracking component, wherein each electronic tracking component, by use of a processor:
      determines the current location of the tracking component;
      determines if the current location of the tracking component is within one or more designated work locations;
      if the current location of the tracking component is within the one or more designated work locations:
         logs in the tracking component for tracking; and
         tracks the time spent by the tracking component within the one or more designated work locations;
      if the current location of the tracking component is not within the one or more designated work locations:
         logs out the tracking component for tracking; and
      sends an electronic communication to an evaluation module, the electronic communication indicative of the time spent by the tracking component within the one or more designated work locations; and
   the evaluation module, by a processor:
      receives the electronic communication from the tracking component; and
      identifies an employee to which the tracking component has been assigned, wherein at least a portion of the employee's duties include providing healthcare services to a patient;
      attributes the time spent by the tracking component within the one or more designated work locations to the employee;
      links the time spent within the one or more designated work locations to a medical record of the patient;
      determines if the time attributed to the employee within the one or more designated work locations exceeds a predetermined threshold for the employee; and alerts a supervisor if the predetermined threshold is exceeded.

19. The method of claim 18, wherein alerting a supervisor includes at least one of:
a page;
an email;
a visual alarm;
an audio alarm;
a text message; or
a push notification.

20. The method of claim 18, wherein the employee includes a resident physician.

21. The method of claim 18, wherein the one or more designated work locations includes a hospital department.

* * * * *